United States Patent
Prenzel et al.

(10) Patent No.: US 8,449,962 B2
(45) Date of Patent: May 28, 2013

(54) ADHESIVE ASSEMBLY TAPES

(75) Inventors: Alexander Prenzel, Hamburg (DE); Matthias Heins, Hamburg (DE); Esther von Possel, Hamburg (DE); Kay Brandes, Otter (DE)

(73) Assignee: tesa SE, Hamburg (DE)

( * ) Notice: Subject to any disclaimer, the term of this patent is extended or adjusted under 35 U.S.C. 154(b) by 236 days.

(21) Appl. No.: 12/892,463

(22) Filed: Sep. 28, 2010

(65) Prior Publication Data
US 2011/0081535 A1 Apr. 7, 2011

(30) Foreign Application Priority Data
Oct. 2, 2009 (DE) .................. 10 2009 048 036

(51) Int. Cl.
B32B 9/00 (2006.01)
B32B 27/30 (2006.01)
B32B 27/08 (2006.01)
C09J 7/02 (2006.01)
C08F 20/06 (2006.01)
C08F 20/10 (2006.01)

(52) U.S. Cl.
USPC .......... 428/40.1; 428/220; 428/343; 428/354; 428/355 AC; 428/355 EP

(58) Field of Classification Search
USPC ................. 428/40.1, 220, 343, 354, 355 AC, 428/355 EP; 526/317.1, 318.44
See application file for complete search history.

(56) References Cited

U.S. PATENT DOCUMENTS

| 4,421,822 A | 12/1983 | Levens |
| 6,767,935 B1 * | 7/2004 | Luchterhandt et al. ....... 522/100 |
| 7,935,383 B2 * | 5/2011 | Zollner et al. ............. 427/207.1 |
| 2008/0118751 A1 * | 5/2008 | Zollner et al. ................ 428/343 |
| 2009/0053447 A1 | 2/2009 | Zollner et al. |
| 2010/0137524 A1 | 6/2010 | Grittner et al. |

FOREIGN PATENT DOCUMENTS

| DE | 10 2008 052 625 A1 | 4/2010 |
| EP | 2 062 951 A1 | 5/2009 |
| EP | 1 800 722 A1 | 9/2009 |
| EP | 2 123 728 A1 | 11/2009 |
| EP | 2 192 148 A1 | 6/2010 |
| WO | 01/29144 A1 | 4/2001 |
| WO | 2005/059052 A1 | 6/2005 |
| WO | 2008/111287 A1 | 9/2008 |
| WO | 2008/101004 A1 | 11/2008 |
| WO | 2009/005118 A1 | 1/2009 |

OTHER PUBLICATIONS

European Search Report Dated May 27, 2011.

* cited by examiner

*Primary Examiner* — Michael M Bernshteyn
(74) *Attorney, Agent, or Firm* — Norris McLaughlin & Marcus PA

(57) ABSTRACT

The invention relates to double-sided adhesive tape comprising a viscoelastic, first polymer layer, a second polymer layer on the top face and a third polymer layer on the bottom face of the viscoelastic, first polymer layer, where the viscoelastic, first polymer layer is based on a polymer which is obtainable by polymerization of a monomer composition of 65% to 97% by weight of ethylhexyl acrylate and/or butyl acrylate, 0% to 30% by weight of methyl acrylate, 3% to 15% by weight of acrylic acid, the viscoelastic interlayer being crosslinked, the second polymer layer is based on a polymer which is obtainable by polymerization of a monomer composition of 85% to 95% by weight of ethylhexyl acrylate and/or butyl acrylate, 5% to 15% by weight of acrylic acid, this second polymer layer being thermally crosslinked using at least one epoxycyclohexyl derivative in the absence of accelerators.

19 Claims, No Drawings

ADHESIVE ASSEMBLY TAPES

The invention relates to single-sided and more particularly double-sided adhesive tapes comprising a carrier layer (interlayer) and also layer of pressure-sensitive adhesive arranged on at least one side of this carrier layer. At least on the side with the pressure-sensitive adhesive, the adhesive tapes have very high bond strengths.

For a variety of areas of application, such as in the construction sector, in the industrial manufacture of technical products, or for assembly purposes, for example, increasingly thick yet strongly bonding adhesive tapes (referred to as "adhesive assembly tapes") are required. Since the bonds take place frequently outdoors and/or the bonded products are exposed to the external effects of weathering, the expectations concerning the properties of such adhesive tapes are frequently high: accordingly, the bond is to be strong, durable and weathering-resistant; in many cases a high moisture resistance, heat resistance, and heat and humidity resistance; advantageously the adhesive tapes ought to be able to compensate unevennesses in the bonded joint and/or on the substrates to be bonded; and increasingly, for thick adhesive tapes as well, high transparency is desired (in the area, for instance, of the bonding of transparent materials such as glasses or transparent plastics).

The adhesive tapes used for such purposes are commonly furnished with adhesives, for which the adhesive properties must be very well tailored. Thus it is necessary for cohesion, tack, flow behaviour, and other properties to be very precisely adjusted. Since the technical forms of the pressure-sensitive adhesive that influence these properties frequently have mutually opposing effects on the individual properties, tailoring is generally difficult, or else compromises must be accepted in the outcome.

For very thick adhesive tapes in particular, moreover, it is frequently difficult to realize highly homogeneous adhesive tapes; for processing-related reasons, very thick adhesive tapes are frequently not very homogeneous through the layer.

This quality, however, is likewise undesirable, since often there is a need for adhesive tapes which have well-defined properties independently of their layer thickness and of the production.

Materials having viscoelastic properties that are suitable for pressure-sensitive adhesion applications are notable for reacting to mechanical deformation both with viscous flow and with elastic forces of resilience. Both processes are in a certain ratio to one another in terms of their respective component, as a function not only of the precise composition, the structure and the degree of crosslinking of the material in question, but also of the rate and duration of the deformation, and also of the temperature.

The component viscous flow is necessary in order to achieve adhesion. Only the viscous components, brought about by macromolecules having a relatively high mobility, allow good wetting and good flow onto the substrate to be bonded. A high viscous flow component results in a high inherent tack and hence often in a high bond strength as well. Highly crosslinked systems, crystalline polymers or polymers that have undergone glasslike solidification are generally not tacky, for lack of flowable components.

The component elastic forces of resilience are necessary in order to obtain cohesion. They are brought about, for example, by very long-chain macromolecules with a high degree of coiling, and also by physically or chemically crosslinked macromolecules, and allow transmission of the forces which engage upon an adhesive bond. Their result is that an adhesive bond is able to withstand sufficiently, over a relatively long period of time, a long-term load acting on it, in the form, for example, of a long-term shearing load.

In order to prevent flow-off (a downwards running) of the pressure-sensitive adhesives from the substrate and in order to guarantee sufficient stability of the pressure-sensitive adhesive in the adhesively bonded assembly, then, sufficient cohesion on the part of the pressure-sensitive adhesives is required. For good adhesion properties, however, the pressure-sensitive adhesives must also be capable of flowing onto the substrate and guaranteeing sufficient wetting of the substrate surface. In order to prevent fractures within the bonded joint (within the layer of pressure-sensitive adhesive), furthermore, a certain elasticity on the part of the pressure-sensitive adhesive is required.

In order to achieve sufficient cohesion of the pressure-sensitive adhesives in the adhesive tapes, the pressure-sensitive adhesives are generally crosslinked—that is the individual macromolecules are linked with one another by bridging bonds. Crosslinking may take place in a variety of ways—for instance, there are physical and chemical (thermal) crosslinking methods.

For the production of homogeneous adhesive tapes it is advantageous to carry out the thermal crosslinking of the polymers: it is readily possible to supply even thick layers with thermal energy in a uniform manner. Layers of adhesive which have been crosslinked by actinic radiation (such as by ultraviolet radiation or electron beams, for example), in contrast, exhibit a crosslinking profile through the crosslinked layer. This crosslinking profile is a result of the fact that the rays or beams possess only a limited depth of penetration into the layer, with the intensity of the radiation, moreover, decreasing in line with the depth of penetration, as a result of absorption processes. The external regions of a radiation-crosslinked layer of adhesive are therefore more strongly crosslinked than the regions situated further inwards, with the intensity of crosslinking decreasing towards the interior. For thick layers in particular this effect is highly significant.

From a process standpoint, very thick polymer layers can be prepared very much more effectively from the polymer melt (known as hotmelts) than from the polymer solution. Since the layers are produced by coating from the melt, but, for homogeneous distribution of thermal crosslinkers for initiating a subsequent thermal crosslinking, it is necessary for these same crosslinkers to be added prior to coating, the problem arises that the thermal crosslinkers are exposed to the high temperatures for producing the polymer melt and therefore lead, even before crosslinking, to uncontrolled polymer crosslinking (known as gelling). In order largely to suppress this gelling, the crosslinkers used in the hotmelt process are usually very slow to react, and are used only a short time prior to coating. In order nevertheless to obtain crosslinking outcomes which are satisfactory after coating, compounds known as "accelerators" are also admixed.

For polymer systems coated from solution as well and intended for thermal crosslinking, the use of accelerators may be useful, and is frequently realized. The thermally initiated crosslinking operation is usually connected with the thermal removal of the solvent from the applied layer (in other words the drying of the layer of adhesive). Too rapid a removal of the solvent results in a poorly formed layer, lacking uniformity and homogeneity, since excessively radical drying leads, for example, to formation of bubbles. For this reason, therefore, the drying is carried out at moderate temperatures. In order nevertheless to guarantee effective and sufficiently rapid crosslinking even at these temperatures, it is usual to add accelerators to the solvent systems as well.

Coating from solution is frequently preferred when the thickness of the resulting layers is not very great, and so increased viscosity of the polymer solution to be applied (in comparison to a largely solvent-free melt) does not entail significant problems.

Accelerators, or else substances with an accelerating action, that are used are, in particular, proton acceptors, electron-pair donors (Lewis bases) and/or electron-pair acceptors (Lewis acids). Accelerators are those compounds or chemicals which support crosslinking reactions by ensuring a reaction rate which is sufficient in accordance with the invention. This is done, in particular, by catalysis (through activation of the crosslinking reaction) and/or through conversion of functional groups in the crosslinker substances or in the macromolecules to be crosslinked into functional groups which are able to react in the sense of a linking reaction of the macromolecules with one another (bridge formation, network formation) or with further functional groups.

The accelerators themselves do not participate in such a linking reaction (in other words, do not themselves crosslink), but ultimately may themselves be attached to or incorporated into the network, in the form of reaction products or in the form of fragments. The accelerator thus ensures a substantial improvement in the kinetics of the crosslinking reaction.

Crosslinkers, on the other hand, are substances which are able by virtue of their own functional groups to participate in a reaction, especially an addition reaction or substitution reaction, that leads to bridge formation for the formation of a network, or which have functional groups that—for example through the aforementioned acceleration effect or through other processes—are converted in the course of the crosslinking reaction into functional groups which result in the corresponding bridge formation between the macromolecules of the polymers to be crosslinked.

In the case of selected reaction parameters, here in particular a temperature lower than the melting temperature of the polyacrylates, the crosslinking reaction would not take place, or would not take place at a sufficient rate, in the absence of the accelerator. Many epoxides which are used as crosslinkers are by their nature fairly slow to react, and so do not lead to satisfactory crosslinking outcomes without accelerators.

Proton donors, especially carboxylic acids or carboxylic acid groups, and/or their deprotonated derivatives, are not included among accelerators for the purposes of the invention.

The presence of accelerators in pressure-sensitive adhesives, however, also has disadvantages. For instance, nitrogen-containing accelerators in particular, such as amines, for example, tend to yellow over time as a result of oxidation processes, meaning that accelerator systems of this kind are unsuitable or poorly suited especially for transparent pressure-sensitive adhesives which are to be used, for example, for optical purposes.

Accelerators which are saltlike or form salts (especially basic accelerators), such as the aforementioned amines or else zinc chloride, for instance, result in an increased moisture capacity on the part of the product, since salts generally possess hygroscopic properties. For pressure-sensitive adhesives in particular, which in view of the intended field of use are to have a very high heat and humidity resistance, accelerators of this kind are not suitable.

The aim is therefore to achieve the thermal crosslinking of polyacrylates as pressure-sensitive adhesives, especially for those layers which are in air contact, without admixture of accelerators.

It is an object of the invention to offer acrylate-based, thermally crosslinked polymers (especially pressure-sensitive adhesives), particularly for strongly adhering, double-sided, pressure-sensitive adhesive tapes. The crosslinked polyacrylates ought advantageously to have a very low yellowing tendency, but a high heat and humidity resistance.

The polyacrylates shall very preferably be preparable, processable and/or, in particular, coatable via the hotmelt process, and shall nevertheless be suitable for thermal crosslinking.

A further object of the invention is to offer strongly adhering adhesive tapes using the stated polyacrylates.

The invention provides a process for the crosslinking of polyacrylates, more particularly pressure-sensitive polyacrylate adhesives which are obtainable by polymerization of a monomer mixture containing at least 5% by weight of acrylic acid, the polyacrylates being crosslinked using as crosslinker(s) at least one epoxycyclohexyl derivative in the absence of accelerators. In the polymer to be crosslinked, therefore, there are no accelerators present, in particular no proton acceptors, no electron-pair donors (Lewis bases) and/or no electron-pair acceptors (Lewis acids), with none, in particular, having been added. The absence in this context relates in particular to accelerators added externally (i.e. not incorporated by polymerization or installed in the polymer framework); with particular preference, there are neither externally added nor copolymerized accelerators present, and very preferably no accelerators at all.

The polyacrylates crosslinked as above advantageously have an elastic component of more than 80%, preferably of more than 85%, very preferably of more than 90%.

All data relating to the elastic component refer to values which can be determined in accordance with measurement method H3 set out in the experimental section of this specification; for this purpose, the polymer layers corresponding to the polymer layers present in the adhesive tapes of the invention, in the form of individual layers on a PET film 23 µm thick, are subjected to measurement in accordance with method H3, and the elastic component is ascertained.

The invention further provides adhesive tapes comprising at least one first, viscoelastic polymer layer having a top face and a bottom face, and also at least one second polymer layer, which in particular is directly adjacent to the first polymer layer, on the top faces of the viscoelastic polymer layer, where the viscoelastic polymer layer is based on a polyacrylate which is obtainable by polymerization of a monomer composition of 65% to 97% by weight of ethylhexyl acrylate and/or butyl acrylate, 0% to 30% by weight of methyl acrylate, 3% to 15% by weight of acrylic acid, the viscoelastic polymer layer being crosslinked, the second polymer layer is based on a polymer which is obtainable by polymerization of a monomer composition of 85% to 95% by weight of ethylhexyl acrylate and/or butyl acrylate, 5% to 15% by weight of acrylic acid, the second polymer layer being thermally crosslinked using an epoxycyclohexyl derivative in the absence of accelerators, more particularly of proton acceptors, electron-pair donors (Lewis bases) and/or electron-pair acceptors (Lewis acids).

Since the second polymer layer, at least in the adhesive-tape assembly described, has outwardly tacky properties, the second polymer layer is also referred to below as layer of pressure-sensitive adhesive.

The invention relates more particularly to double-sided adhesive tapes, comprising a first, viscoelastic polymer layer having a top face and a bottom face (in the text below, for double-sided adhesive tapes, also referred to as "interlayer"), and also a second polymer layer on the top face and a third polymer layer on the bottom face of the interlayer, where the viscoelastic interlayer is based on a polyacrylate which is obtainable via polymerization of a monomer composition of
65% to 97% by weight of ethylhexyl acrylate and/or butyl acrylate,
0% to 30% by weight of methyl acrylate,
3% to 15% by weight of acrylic acid,
the viscoelastic interlayer being crosslinked,
at least the second polymer layer is based on a polymer which is obtainable by polymerization of a monomer composition of
85% to 95% by weight of ethylhexyl acrylate and/or butyl acrylate,
5% to 15% by weight of acrylic acid,
the second polymer layer being thermally crosslinked using an epoxycyclohexyl derivative in the absence of accelerators, more particularly of proton acceptors, electron-pair donors (Lewis bases) and/or electron-pair acceptors (Lewis acids).

Here again, the second polymer layer is a layer of pressure-sensitive adhesive, and therefore, at least in the adhesive-tape assembly described, has outwardly tacky properties.

Moreover, in the double-sided adhesive tape, the third polymer layer very preferably has adhesive properties, more particularly tacky properties.

The bond strength to steel (all figures for the bond strength to steel refer to values which can be determined in accordance with the 90° bond strength test—measurement method V1—described in the experimental section of this specification) of the adhesive tapes of the invention on the part of the second polymer layer (in other words, the bond strength on the top face of the adhesive tape) is with particular preference at least 10 N/cm or more, more preferably at least 15 N/cm or more, very preferably 17 N/cm or more.

The terms top face and bottom face are used in the context of this specification merely for the purpose of local differentiation between the two surfaces of the first polymer layer, and are not intended over and above this to contain any other directional information. On the "top face", therefore, means, in particular, on one of the sides of the layer in question, while on the bottom face means on the other side of the layer in question.

The dependent claims relate to advantageous developments and embodiments of the invention.

The nature of the polymer layers and their physical properties (for example viscoelasticity, cohesion, elastic component) can be influenced through the nature and the degree of crosslinking.

The teaching of the invention further encompasses, accordingly, the concept of subjecting a polyacrylate, more particularly a pressure-sensitive polyacrylate adhesive, having a high acrylic acid content (i.e. obtainable by polymerization of a monomer composition which contains at least 5% by weight of acrylic acid), to thermal crosslinking, and to do so using one or more epoxycyclohexyl derivatives, in particular alone, but if desired also in combination with other crosslinkers, but in any case in the absence of accelerator substances, more particularly of proton acceptors, electron-pair donors (Lewis bases) and/or electron-pair acceptors (Lewis acids), in the layer to be crosslinked with the epoxycyclohexyl derivative.

With a process of this kind it is possible to produce the second polymer layers outstandingly.

It has emerged as being particularly advantageous to make use as crosslinker(s) of one or more epoxycyclohexylcarboxylates, with particular preference (3,4-epoxycyclohexane)methyl 3,4-epoxycyclohexylcarboxylate (CAS 2386-87-0).

The epoxycyclohexyl derivative crosslinker or crosslinkers is/are present in the pressure-sensitive adhesive for crosslinking preferably in a total amount of up to 0.4 part by weight, very preferably up to 0.3 part by weight (based in each case on 100 parts by weight of polymer to be crosslinked [if no other additives or fillers have been admixed to the pressure-sensitive adhesive, i.e., on 100 parts by weight of pressure-sensitive adhesive to be crosslinked]). With crosslinker quantities of more than 0.3 part by weight to 100 parts by weight of polymer, detractions from the bond strength are increasingly likely. Typical crosslinker quantities are situated, for example, in the range from 0.15 to 0.25 part by weight, more particularly at 0.2 part by weight (to 100 parts by weight of polymer).

The viscoelastic polyacrylate layer as well (the viscoelastic interlayer) is preferably crosslinked thermally, leading to a very homogeneous embodiment of the viscoelastic layer. With particular preference the thermal crosslinking takes place through use of one or more glycidyl ethers, in particular one or more polyglycidyl ethers, very preferably using pentaerythritol tetraglycidyl ether (CAS 3126-63-4) as crosslinker. With particular advantage, crosslinking takes place in combination with an amine or an amide, more preferably with triethylenetetramine (CAS 112-24-3), as accelerator. The crosslinker for the viscoelastic polyacrylate layer is added to the polyacrylate to be crosslinked preferably in an amount of up to 1.0 part by weight, very preferably up to 0.8 part by weight (based on 100 parts by weight of polymer to be crosslinked). Typical crosslinker quantities are situated, for example, in the range from 0.1 to 0.6, more particularly 0.15 to 0.5 part by weight (based on 100 parts by weight of polymer).

The accelerator is present advantageously in an amount of 0.1 to 0.3 part by weight (based on 100 parts by weight of polymer).

In the case of three-layer or multi-layer constructions in particular, the presence of an amine accelerator in the viscoelastic polyacrylate layer is not critical, since in these cases the interlayer is largely shielded from the influence of oxidizing substances such as atmospheric oxygen, for instance, by the external layers of adhesive or pressure-sensitive adhesive.

The viscoelastic polymer layer can be considered to be a liquid of very high viscosity which under a pressure load exhibits flow behaviour (also referred to as "creep"). Viscoelastic polymers in the sense of the first viscoelastic polymer layer of the invention preferably have the capacity even as a result of gravity, in other words under the load of their own weight, to flow more or less slowly, and in particular to flow onto a substrate. This effect, however, occurs at least under an external pressure exposure. An increase in pressure, as for instance through the pressing of the adhesive tape onto a substrate, may significantly accelerate this behaviour.

Viscoelastic polymers in the sense of the first viscoelastic polymer layer of the invention possess the capacity, moreover, in the case of slow force exposure, to relax the forces to which they are exposed: they are capable of dissipating the forces into vibrations and/or deformations (which in particular may also be—at least partly—reversible), and hence of "buffering" the acting forces and preferably avoiding mechanical destruction by the acting forces, but advantageously at least reducing the forces or else at least delaying the point in time at which destruction occurs. In the case of a force acting very rapidly, viscoelastic polymers typically display elastic behaviour, in other words the behaviour of a fully reversible deformation, where forces which are beyond the elasticity capacity of the polymers can lead to a fracture.

Contrasting with these are elastic materials, which exhibit the described elastic behaviour even under slow force exposure.

The adhesive tape, especially double-sided adhesive tape, of the invention has significant differences from the adhesive tapes of the prior art:

As a result of the thermal crosslinking, first, the pressure-sensitive adhesive tape has no crosslinking profile through its layers. Viscoelastic layers and also layer of pressure-sensitive adhesive, which have been crosslinked by actinic radiation (ultraviolet radiation, electron beams), exhibit a crosslinking profile through the crosslinked layer in each case. Thermally crosslinked layers of adhesive do not exhibit this behaviour, since the heat is able to penetrate the layer uniformly.

The absence of the accelerator substances can be demonstrated analytically (systems crosslinked in the presence of accelerators contain residues of these accelerators, such as, for instance, nitrogen compounds in the case of amines or amides as accelerators, zinc chloride or the like).

Moreover, it has been demonstrated, as set out in the experimental section of this specification, that the pressure-sensitive polyacrylate adhesives crosslinked thermally using epoxycyclohexyl derivatives as crosslinkers had a higher bond strength than the systems crosslinked using other crosslinkers. This quality can probably be attributed to a specific crosslinking structure. The aforementioned article therefore differs significantly from the adhesive tapes which, after crosslinking using other crosslinkers, have lower bond strengths and poorer adhesive properties.

This difference is very significant for the adhesive tapes of the invention. If a viscoelastic layer of the stated type is employed, and is furnished on at least one side with a pressure-sensitive polyacrylate adhesive which has the stated composition and has been crosslinked thermally using at least one epoxycyclohexyl derivative, then bond strengths on that side of the adhesive tape are significantly higher than in the case of systems which have the corresponding pressure-sensitive adhesive on an elastic polymer carrier (conventional film carriers such as PET, PE, PVC, for example), or which have the same viscoelastic carrier, but have a pressure-sensitive adhesive which is different, albeit per se (in other words, for example, with elastic film substrates as carriers) significantly more tacky.

Surprisingly, with regard to the bond strength of the adhesive tape, a part is played not only by the external pressure-sensitive adhesive, but also by the viscoelastic carrier, and so for the outstanding adhesive properties it is the overall system that is important. The inventive concept, then, includes the combination of a viscoelastic, relatively soft polymer layer with a layer of pressure-sensitive adhesive which per se (in other words, for example, with elastic film substrates as carriers) is not strongly tacky; the adhesive characteristics on the part of the layer of pressure-sensitive adhesive are optimized by the interaction of both layers, and, in this way, bond strengths are achieved which are significantly higher than in the case of layers of pressure-sensitive adhesive whose tack per se is good (particularly those layers which are present on conventional—especially elastic—carriers).

In accordance with the invention, success has been achieved in using a cohesive PSA (pressure-sensitive adhesive) having per se a relatively low tack as a PSA for an adhesive tape with very high bond strength; more particularly, in very significantly increasing the external bond strength of a very cohesive polymer layer of relatively low tack, present on elastic carriers (bond strength to steel under these conditions <10 N/cm or well below, for example <7 N/cm) (and the increase being to a level of more than 10 N/cm, preferably of more than 15 N/cm) by providing, adjacent to this cohesive polymer layer, a soft, viscoelastic polymer layer, the viscoelastic polymer layer as well having bond strengths per se of less than 10 N/cm, more particularly of less than 7 N/cm. With adhesive tapes for which the bond strength is attributable solely to the external PSA it is often necessary to make a compromise between adhesion and cohesion (see introductory section). Surprisingly, success has been achieved in obtaining outstanding overall properties through control of the properties of two different layers, which can be optimized individually.

In accordance with the invention, success has been achieved in increasing the bond strength of the adhesive tape to steel to more than twice the strength, relative to the bond strength of the second polymer layer to steel when that layer is present on a conventional carrier. With respect to the bond strength of the viscoelastic, first polymer layer to steel as well, the bond strength of the adhesive tape of the invention to steel is more than twice as high. Moreover, the adhesive tapes possess high shear resistance times (holding power) at high temperatures (at 70° C., for example).

The viscoelastic properties of a layer and the cohesive properties of a further layer can be described quantitatively by way of their elastic components.

Very advantageously the viscoelastic, first polymer layer has an elastic component of less than 80%, preferably less than 75%, but more preferably of more than 50% by weight, more preferably of more than 60%.

Very advantageously the second polymer layer has an elastic component of more than 80%, preferably more than 85%, very preferably more than 90%.

Very advantageously the third polymer layer has an elastic component of more than 80%, preferably more than 85%, very preferably more than 90%.

The invention therefore further embraces an at least single-sidedly adhesive, at least two-layer adhesive tape, characterized by a first, viscoelastic polymer layer having an elastic component of not more than 80%, and a second polymer layer, adjacent to the first polymer layer, which has an elastic component of at least 80% or more.

The bond strength to steel of the adhesive tapes of the invention on the part of the second polymer layer here as well is at least 10 N/cm or more, preferably at least 15 N/cm or more, more preferably 17 N/cm or more.

In principle it is possible, both for the viscoelastic, first polymer layer and for the second and third polymer layers, independently of one another, to use any polymers, particularly when the conditions for the resultant adhesive tape with regard to the bond strengths to the exterior are met.

It has emerged as being especially advantageous if the viscoelastic, first polymer layer is a polyacrylate-based or polyurethane-based layer. However, a viscoelastic, first polymer layer based on rubber, more particularly on natural rubber, is also realizable and has led to good results.

As polymers for the second and/or third polymer layer it is possible with outstanding effect, independently of one another, to use polyacrylates, synthetic rubbers (e.g. styrene-butadiene-styrene rubbers, styrene-isoprene-styrene rubbers, hydrogenated derivatives of the aforementioned rubbers) and polymer mixtures of polyacrylates and synthetic rubbers.

Particularly preferred adhesive tapes are those in which both the first polymer layer and the second polymer layer are based on polyacrylate (more particularly, are obtainable from a monomer mixture comprising at least 50%, preferably at least 80%, and very preferably exclusively acrylic and/or methacrylic monomers), and with particular preference the third polymer layer as well.

For the implementation of the inventive concept, therefore, at least a two-layer system is advantageous, specifically a viscoelastic, first polymer layer, advantageously of the type described in Claim 1 (i.e., based on a crosslinked polymer which is obtainable by polymerization of a monomer composition of 65% to 97% by weight of ethylhexyl acrylate and/or butyl acrylate, 0% to 30% by weight of methyl acrylate, 3% to 15% by weight of acrylic acid) and also a second polymer layer (also referred to below as PSA layer, since in the adhesive tape it takes on the function of outward tack), and advantageously one of the type likewise described in Claim 1 for this layer (i.e., based on a polymer which is obtainable by polymerization of a monomer composition of 85% to 95% by weight of ethylhexyl acrylate and/or butyl acrylate and 5% to 15% by weight of acrylic acid, the PSA layer being thermally crosslinked using an epoxycyclohexyl derivative).

On the reverse side of the viscoelastic polymer layer, for the purpose of stabilization or of lining, it is possible, for example, for there to be a liner or a conventional film material, thereby producing at least a three-layer system comprising the at least two-layer adhesive system of the invention.

In the case of sufficiently thick viscoelastic polymer layers, the side facing away from the PSA layer, in two-layer systems the exposed side of the viscoelastic polymer layer, may also be stabilized by being highly crosslinked, by means of a crosslinking operation with a low penetration depth, so that only part of the thickness of the viscoelastic carrier layer is highly crosslinked, while, on the other side of the viscoelastic adhesive layer, facing the PSA layer, the viscoelastic properties are retained.

For the application of the adhesive tapes it is advantageous to offer at least double-sided adhesive tapes, in other words to use at least three-layer adhesive systems in which, on the other side of the viscoelastic, first polymer layer (on the surface of the viscoelastic polymer layer that faces away from the second polymer layer (PSA layer)), a further layer of adhesive is provided directly or indirectly.

For a very advantageous embodiment of the adhesive tape of the invention, both layers of adhesive are PSA layers of the stated kind, in other words those which have an elastic component of more than 80% and/or in particular those based in each case on a polymer which is obtainable by polymerization of a monomer composition of 85% to 95% by weight of ethylhexyl acrylate and/or butyl acrylate and 5% to 15% by weight of acrylic acid, the PSA layer being thermally crosslinked using an epoxycyclohexyl derivative. With these adhesive-tape systems, both sides have the advantageous adhesive properties, and so these systems can be used, for example, for double-sided bonds for which very high bond strengths are required.

In a further development, the second and third polymer layers (the PSAs on both sides of the double-sided adhesive tape of the invention) are identical chemically, physically or in terms of their dimensions. It is advantageous if the second and third polymer layers are provided with identical adjuvants (in particular functional adjuvants and/or fillers) and/or adjuvants (in particular, functional adjuvants and/or fillers) in identical quantity (this includes the possibility that both layers may also be adjuvant-free and/or filler-free).

Very advantageously, the second and third layers may also be completely identical (without regard to insubstantial impurities, production inaccuracies, and other—especially unintended—aspects).

The bond strength to steel of the adhesive tapes of the invention on the part of the third polymer layer (in other words the bond strength to the bottom face of the adhesive tape) is with particular preference at least 10 N/cm or more, very preferably at least 15 N/cm or more, extremely preferably 17 N/cm or more.

It has emerged as being very advantageous if PSA layers are resin-free, in other words if no bond strength enhancer resins have been admixed to the PSA or PSAs. Resins typically added to PSAs for the purpose of enhancing bond strength include, for example, aliphatic hydrocarbon resins, aromatic hydrocarbon resins, alkylaromatic hydrocarbon resins, terpene resins, terpene-phenolic resins, rosins (especially hydrogenated, nonhydrogenated or disproportionated rosins), functional hydrocarbon resins, natural resins and the like. A feature of the PSAs of the invention is that very good adhesive properties can be obtained even in the absence of these and other tackifier resins, despite the fact that the PSAs per se are very cohesive and have little tack.

In a very preferred procedure, the first viscoelastic polyacrylate layer is formed by the polymer (and so, therefore, the viscoelastic, first polymer layer is composed of the polymer) which is obtainable by polymerization of a monomer composition of 65% to 97% by weight of ethylhexyl acrylate and/or butyl acrylate, 0% to 30% by weight of methyl acrylate, 3% to 15% by weight of acrylic acid, this recitation advantageously being conclusive and there being no other monomers present in the polymer and/or no other components present in the viscoelastic polyacrylate layer. In one advantageous embodiment of the invention, the viscoelastic, first polymer layer is also adjuvant-free and/or filler-free.

In an advantageous way, one of the PSA layers, and preferably both PSA layers, is or are (each) formed by a polymer (and so the second and/or third polymer layers are composed of the polymer) which is obtainable by polymerization of a monomer composition of 85% to 95% by weight of ethylhexyl acrylate and/or butyl acrylate and 5% to 15% by weight of acrylic acid, this recitation advantageously being conclusive, meaning that there are no further monomers present in the polymer and/or no further components present in the PSA or PSAs.

For the viscoelastic polyacrylate layer it is advantageous if the ratio of ethylhexyl acrylate to butyl acrylate is in the region of at least 1:1, preferably of 2:1 or more.

For each PSA it is of advantage if the ratio of ethylhexyl acrylate to butyl acrylate is in the region of at least 1:1, preferably of 2:1 or more.

In principle, the greater the fractions of linear alkyl radicals and the more linear the alkyl radicals, the higher the unwanted tendency towards side-chain crystallization. Through the ratio of ethylhexyl acrylate to butyl acrylate it is also possible to influence the glass transition temperature of the polymer.

For handling, for storage and/or for offering the adhesive tapes, in particular, they may be provided on one side or else on both sides with a release material (for example, silicones, films, siliconized films or papers, surface-treated films or papers, or the like, known as liners).

The adhesive tapes of the invention may also comprise further layers, in other words constitute multi-layer systems (layer sequence greater than three). It is particularly advantageous if in this case an as-described viscoelastic layer is furnished directly or, where appropriate, indirectly with an as-described PSA layer, in particular in order to ensure the bond strength enhancement and/or improvement in adhesive properties described in this specification.

A feature of the pressure-sensitive adhesive tapes of the invention is that they can be produced as very thick products which, moreover, possess very high bond strengths. Products of this kind find application, for example, in the construction sector or for bonds where there are unevennesses or cavities to be compensated.

In view of the good relaxation behaviour of the viscoelastic layer, the adhesive tapes of the invention are suitable for absorbing forces, such as mechanical stresses, impacts and the like, and of dissipating the energy. The adhesive tapes of the invention are therefore also very suitable wherever, for example, an impact-damping effect and/or vibration-damping effect is desired, such as for the bonding of fragile articles, in the electronics sector or the like. It is advantageous in particular to use the adhesive tapes of the invention when materials having different heat expansion coefficients are to be bonded to one another, since by virtue of their relaxation properties the adhesive tapes of the invention are able to dissipate stresses which result in particular under hot conditions as a result of a difference in expansion behaviour on the part of the surfaces or articles bonded to one another. When the expansion behaviour of the bonded articles is very different, conventional adhesive tapes frequently tend to fail—that is, weakening occurs, or there is even a fracture of the bond site.

The adhesive tapes of the invention can be produced in "typical" adhesive-tape thicknesses of from a few to several hundred micrometers, but also advantageously in thicknesses of more than 300 µm, for example 500 µm or more, 1000 µm or more, 1500 µm or more, 2000 µm or more or else 3000 µm or more. Products even thicker can also be realized.

It has been found that, on the one hand, the thickness of the PSA layer provided on the adhesive-tape side in question, but also, on the other hand, the thickness of the underlying viscoelastic, first polymer layer, have a possibly more or less large influence on the bond strengths on a respective side of the adhesive tape.

It is of advantage to configure the second and/or third polymer layers, especially the PSA layers, in a layer thickness of preferably up to 100 µm, more preferably of up to 75 µm. Layer thicknesses of up to 50 µm or even lower have emerged as being particularly advantageous. Thus it is possible, for instance, to realize adhesive tapes which are provided on both sides with a PSA layer of 50 µm in each case, examples being tapes of the kind which have a viscoelastic interlayer having a thickness of 400 µm, of 900 µm, of 1400 µm, of 1900 µm or of 2400 µm.

The polymers used for the viscoelastic, first polymer layer, for the second polymer layer and/or for the third polymer layer preferably, independently of one another, have in each case a weight-average molecular weight (GPC; cf. measurement method A3) of at least $M_w$=500 000 g/mol, preferably at least $M_w$=700 000 g/mol. Their weight-average molecular weight preferably does not exceed a value of $M_w$=1 700 000 g/mol.

The polymers for the polymer layers can be prepared outstandingly by free radical polymerization, preferably in solution, in accordance with the prior art. In the case of any subsequent processing from the melt, the solvent is stripped off after the polymerization.

The viscoelastic, first polymer layer is preferably shaped to form the layer from the melt. There is preferably thermal crosslinking of the polymer layer.

The second and/or third polymer layers may likewise be shaped from the melt; however, since these layers are usually produced only in layer thicknesses of up to 100 µm, they can also be coated outstandingly from solution and dried thereafter.

The thermal crosslinking of the viscoelastic, first polymer layer and of the second and, where present, third polymer layer(s) [PSA layer(s)] can be carried out simultaneously, as for instance when the second polymer layer and/or third polymer layer are coated onto the as yet uncrosslinked first polymer layer, or when they are shaped together to form a layer in a joint procedure.

The individual layers, however, can also be crosslinked thermally in separate procedures, as for instance when the second polymer layer and/or the third polymer layer are/is coated onto the already thermally crosslinked first polymer layer and are/is then thermally crosslinked, or when the second and/or third polymer layer(s) are/is shaped and crosslinked thermally at a different location—for instance, on a temporary carrier, such as a release material—and then laminated onto the already crosslinked viscoelastic, first polymer layer. For this purpose it may be advantageous, in particular, for the viscoelastic polymer layer and/or the second and/or third polymer layer to be pretreated chemically and/or physically, as for example by corona treatment and/or plasma treatment and/or reactive corona treatment and/or reactive plasma treatment (use of gases, such as nitrogen, oxygen, fluorine and/or others, for example) and/or flame treatment.

The double-sided, especially three-layer, adhesive tapes of the invention can also be produced in particular in accordance with the description given for three-layer and multi-layer systems in EP 05 792 143 A1. The preparation and coating methods described therein may also be employed analogously for the adhesive tapes of this specification; the disclosure content of EP 05 792 143 A1 is therefore considered to be explicitly incorporated into the present disclosure. The same applies to the recitation of the product constructions described in EP 05 792 143 A1.

The subject matter of the invention also encompasses adhesive tapes obtainable by one of the processes recited in this specification and/or obtainable according to at least one process recited in the claims, and, in particular, encompasses those adhesive tapes, obtainable according to one of the processes recited in this specification and/or according to at least one process recited in the claims, which conform to the description in this specification and/or conform to at least one of the product claims.

The adhesive tapes of the invention possess a high transparency (low tendency towards yellowing), the outer layers are photoinitiator-free and nitrogen-free, and the inner layers are shielded by the outer layers from the effect of oxygen.

Particularly if the high transparency of the adhesive tapes is not important for the intended application, the viscoelastic polymer layer and/or one of the two PSA layers may be admixed with fillers. For adjusting the viscoelastic properties of the viscoelastic polymer layer as well, or for adjusting the properties of the second and/or third polymer layers (PSA layers), the admixing of one or more of the stated and/or other fillers may be advantageous.

Thus, for example, in one advantageous development of the adhesive tapes of the invention, the viscoelastic polymer layer is foamed. For this purpose it is advantageous for one or more foaming agents to be added to the polymer, and they can then be utilized for the foaming of the polymer layer.

As suitable additives particularly to the viscoelastic polymer layer or to the polymer from which this layer is produced, and/or as suitable additives to the PSA layers, it is possible, for example, to use foaming agents (thereby ultimately allowing foamed adhesive tapes to be obtained, in other words those having a foamed viscoelastic polyacrylate layer and/or foamed adhesive layer(s)). Suitable foaming agents are, for example, expandable, hollow, polymeric microstructures (unexpanded and/or already wholly or partly preexpanded); particularly hollow structures of the kind which are able to expand when supplied with heat and/or other energy, more particularly gas-filled and/or liquid-filled polymer beads (whose shell, for example, is composed of a thermoplastic material such as polymethyl methacrylate or polystyrene).

Suitable additives for one or more of the layers of the adhesive tape of the invention, particularly the viscoelastic polymer layer, further include hollow polymer beads, solid polymer beads, hollow glass beads, solid glass beads, hollow ceramic beads, solid ceramic beads, and solid carbon beads ("carbon micro-balloons").

The addition of silicas, advantageously precipitated silica surface-modified with dimethyldichlorosilane, can be utilized in order to adjust the thermal shear strength of the polymer layer in question (to increase it; here again, the additization of the viscoelastic, first polymer layer is of advantage in particular). Silicas of this kind can also be used to outstanding effect for transparent products. For transparent adhesive tapes in particular it is advantageous if the silica is added at up to 15 parts by weight per 100 parts by weight of polymer. Here again, the additization of the viscoelastic, first layer is preferred.

The fillers may alternatively be selected such that they do not influence the transparency, influence it only insubstantially, and/or influence it in a way which is not disruptive for the planned application. For this purpose, it is preferred to select the aforementioned and/or other fillers whose expansion is so minimal that they do not lead to optical impairment of the polymer layer in question.

The adhesive tapes of the invention can also be used, outstandingly, in filler-free form, and so no fillers and/or additives are added to the viscoelastic, first polymer layer and/or to the second and/or third polymer layers (PSA layers).

The adhesive tapes of the invention feature good moisture resistance and heat and humidity resistance (absence of salts). They possess a very high bond strength; evidently, success has been achieved in "dividing" the properties of the flow behaviour and of good cohesion, which are necessary for good adhesives, over two different layers and hence in being able to realize a better harmonization of these properties. An effect of this kind was not foreseeable; a person skilled in the art would instead have assumed that the flow properties of the external PSAs would substantially affect the overall adhesive properties. Since, however, good flow properties on the part of the viscoelastic polyacrylate layer result in good flow of the overall product onto the substrate, the PSA layer or layers can be provided with a relatively high cohesion, without detrimental effect on the bond strength of the adhesive tape.

The experimental results forcefully confirm the advantageous properties of the adhesive tapes of the invention.

The adhesive tapes (adhesive assembly tapes) of the invention, especially three-layer or multi-layer adhesive tapes, can be used to particularly good effect in applications requiring high bond strengths, good aging stability and weathering stability (here, in particular, low tendency towards yellowing, and good moisture resistance and heat resistance) and/or the compensation of unevennesses and disuniformities in the substrates and/or adhesive joints. The adhesive tapes of the invention can of course also be used outstandingly in those situations where the demands are less.

The adhesive tapes of the invention are especially suitable for adhesive bonding of (in particular, transparent) advertising boards and/or panels, for glass wall bonds in the interior and/or exterior sector, and also for glass sheet bonds in the interior and/or exterior sector.

Other applications for which the adhesive tapes of the invention are outstandingly suitable are, for example, the sectors of building construction, building extension, building equipment, and architecture (interior and/or exterior in each case), the DIY sector, model construction, furniture making, the automotive industry, shipbuilding and aircraft construction, the electronics and electrical industries (for example, for consumer electronics, white goods, brown goods, and red goods as well on account of the high heat resistance), the traffic sector (road signage and the like), to name but a few.

In view of the good relaxation behaviour of the adhesive tapes of the invention, they can be used outstandingly as or for producing insulation modules (especially for mechanical influences, such as impacts, and acoustic influences, such as noise, for instance).

EXPERIMENTAL SECTION

The following exemplary experiments are intended to illustrate the invention in more detail, but the choice of examples indicated is not intended to subject the invention to any unnecessary restriction.

Measurement Methods:

Solids Content (Measurement Method A1):

The solids content is a measure of the fraction of non-evaporable constituents in a polymer solution. It is determined gravimetrically, by weighing the solution, then evaporating the evaporable fractions in a drying oven at 120° C. for 2 hours and reweighing the residue.

K Value (According to Fikentscher) (Measurement Method A2):

The K value is a measure of the average molecular size of high-polymer materials. It is measured by preparing one percent strength (1 g/100 ml) toluenic polymer solutions and determining their kinematic viscosities using a Vogel-Ossag viscometer. Standardization to the viscosity of the toluene gives the relative viscosity, from which the K value can be calculated by the method of Fikentscher (Polymer 8/1967, 381 ff.)

Gel Permeation Chromatography GPC (Measurement Method A3):

The figures for the weight-average molecular weight $M_w$ and the polydispersity PD in this specification relate to the determination by gel permeation chromatography. Determination is made on a 100 μl sample subjected to clarifying filtration (sample concentration 4 g/l). The eluent used is tetrahydrofuran with 0.1% by volume of trifluoroacetic acid. Measurement takes place at 25° C. The preliminary column used is a column type PSS-SDV, 5μ, $10^3$ Å, ID 8.0 mm·50 mm. Separation is carried out using the columns of type PSS-SDV, 5μ, $10^3$ Å and also $10^5$ Å and $10^6$ Å each with ID 8.0 mm×300 mm (columns from Polymer Standards Service; detection by means of Shodex RI71 differential refractometer). The flow rate is 1.0 ml per minute. Calibration takes place against PMMA standards (polymethyl methacrylate calibration).

180° Bond Strength Test (Measurement Method H1):

A strip 20 mm wide of an acrylate PSA applied to polyester as a layer was applied to steel plates which beforehand had been washed twice with acetone and once with isopropanol. The pressure-sensitive adhesive strip was pressed onto the substrate twice with an applied pressure corresponding to a weight of 2 kg. The adhesive tape was then removed from the substrate immediately with a speed of 300 mm/min and at an angle of 180°. All measurements were conducted at room temperature.

The measurement results are reported in N/cm and are averaged from three measurements.

Shear Resistance Time (Measurement Method H2):

A strip of the adhesive tape 13 mm wide and more than 20 mm long (30 mm, for example) was applied to a smooth steel surface which had been cleaned three times with acetone and once with isopropanol. The bond area was 20 mm·13 mm (length·width), the adhesive tape protruding beyond the test plate at the edge (by 10 mm, for example, corresponding to aforementioned length of 30 mm). Subsequently the adhesive tape was pressed onto the steel support four times, with an applied pressure corresponding to a weight of 2 kg. This sample was suspended vertically, with the protruding end of the adhesive tape pointing downwards.

At room temperature, a weight of 1 kg was affixed to the protruding end of the adhesive tape. The measurement is conducted under standard conditions (23° C., 55% humidity) and at 70° C. in a thermal cabinet.

The shear resistance times measured (times taken for the adhesive tape to detach completely from the substrate; measurement terminated at 10 000 min) are reported in minutes and correspond to the average value from three measurements.

Microshear Test (Measurement Method H3):

This test serves for the accelerated testing of the shear strength of adhesive tapes under temperature load.

Sample Preparation for Microshear Test:

An adhesive tape (length about 50 mm, width 10 mm) cut from the respective sample specimen is adhered to a steel test plate, which has been cleaned with acetone, in such a way that the steel plate protrudes beyond the adhesive tape to the right and the left, and that the adhesive tape protrudes beyond the test plate by 2 mm at the top edge. The bond area of the sample in terms of height·width=13 mm·10 mm. The bond site is subsequently rolled over six times with a 2 kg steel roller at a speed of 10 m/min. The adhesive tape is reinforced flush with a stable adhesive strip which serves as a support for the travel sensor. The sample is suspended vertically by means of the test plate.

Microshear Test:

The sample specimen for measurement is loaded at the bottom end with a weight of 1000 g. The test temperature is 40° C., the test duration 30 minutes (15 minutes' loading and 15 minutes' unloading). The shear travel after the predetermined test duration at constant temperature is reported as the result in µm, as both the maximum value ["max"; maximum shear travel as a result of 15-minute loading]; and the minimum value ["min"; shear travel ("residual deflection") 15 minutes after unloading; on unloading there is a backward movement as a result of relaxation]. Likewise reported is the elastic component in percent ["elast"; elastic fraction=(max−min)·100/max].

90° Bond Strength to Steel—Open and Lined Side (Measurement Method V1):

The bond strength to steel is determined under test conditions of 23° C.+/−1° C. temperature and 50%+/−5% relative humidity. The specimens were cut to a width of 20 mm and adhered to a steel plate. Prior to the measurement the steel plate is cleaned and conditioned. For this purpose the plate is first wiped down with acetone and then left to stand in the air for 5 minutes to allow the solvent to evaporate.

Three-Layer Assembly:

The side of the three-layer assembly facing away from the test substrate was then lined with a 50 µm aluminium foil, thereby preventing the sample from expanding in the course of the measurement. This was followed by the rolling of the test specimen onto the steel substrate. For this purpose the tape was rolled over 5 times back and forth, with a rolling speed of 10 m/min, using a 2 kg roller. Immediately after the rolling-on operation, the steel plate was inserted into a special mount which allows the specimen to be removed at an angle of 90° vertically upwards. The measurement of bond strength was made using a Zwick tensile testing machine. When the lined side is applied to the steel plate, the open side of the three-layer assembly is first laminated to the 50 µm aluminium foil, the release material is removed, and the assembly is adhered to the steel plate, and subjected to analogous rolling-on and measurement.

The results measured on both sides, open and lined, are reported in N/cm and are averaged from three measurements.

Specimen on 23 µm PET Film:

The single-sided test specimen was applied to the steel substrate and then pressed on 5 times, using a 2 kg roller, with a rolling speed of 10 m/min. Immediately after the rolling-on operation, the steel plate was inserted into a special mount which allows the specimen to be removed at an angle of 90° vertically upwards. The measurement of bond strength was made using a Zwick tensile testing machine. The results of measurement are reported in N/cm and are averaged from three measurements.

Shear Resistance—Open and Lined Side (Measurement Method V2):

Specimen preparation took place under test conditions of 23° C.+/−1° C. temperature and 50%+/−5% relative humidity. The test specimen was cut to 13 mm and adhered to a steel plate. The bond area was 20 mm·13 mm (length·width). Prior to the measurement, the steel plate was cleaned and conditioned. For this purpose the plate was first wiped down with acetone and then left to stand in the air for 5 minutes to allow the solvent to evaporate. After bonding had taken place, the open side was reinforced with a 50 µm aluminium foil and rolled over back and forth twice using a 2 kg roller. Subsequently a belt loop was attached to the protruding end of the three-layer assembly. The whole system was then suspended from a suitable device and subjected to a load of 10 N. The suspension device is such that the weight loads the sample at an angle of 179°+/−1°. This ensures that the three-layer assembly is unable to peel from the bottom edge of the plate. The measured shear resistance time, the time between suspension and dropping of the sample, is reported in minutes and corresponds to the average value from three measurements. To measure the lined side, the open side is first reinforced with the 50 µm aluminium foil, the release material is removed, and adhesion to the test plate takes place as described. The measurement is conducted under standard conditions (23° C., 55% relative humidity).

Wall Hook Test (Measurement Method V3):

FIG. 4 shows the production of the pressure-sensitive polyacrylate layers (layer A and/or C). A test specimen (3.1) measuring 30 mm·30 mm and fixed between two polished steel plates (3.2) is subjected to a pressure of 0.9 kN (force P) for 1 minute. Thereafter a lever arm (3.3) 9 cm long is screwed into the uppermost steel plate, and is then loaded with a 1000 g weight (3.4). Care is taken to ensure that the time between application of pressure and loading is not more than two minutes (t≦2 min).

A measurement is made of the holding time, i.e. the time between the suspension and the dropping of the specimen. The result reported is the holding time in minutes as the average from a triplicate determination. The test conditions are 23° C.+/−1° C. and 50% rh+/−5% rh (rh is relative humidity).

Measurements were made in each case of the open side and of the lined side.

Commercially Available Chemicals Used

| Chemical compound | Trade name | Manufacturer | CAS No. |
|---|---|---|---|
| Bis(4-tert-butylcyclohexyl) peroxydicarbonate | Perkadox ® 16 | Akzo Nobel | 15520-11-3 |
| 2,2'-Azobis(2-methylpropionitrile), AIBN | Vazo ® 64 | DuPont | 78-67-1 |
| Pentaerythritol tetraglycidyl ether | Polypox ® R16 Denacol ™ EX-411 | UPPC AG Nagase Chemtex Corp. | 3126-63-4 |
| 3,4-Epoxycyclohexylmethyl 3,4-epoxycyclohexane carboxylate | Uvacure ® 1500 | Cytec Industries Inc. | 2386-87-0 |
| Triethylenetetramine | Epikure ® 925 | Hexion Speciality Chemicals | 112-24-3 |
| Aluminium(III) acetylacetonate | | Sigma-Aldrich | 13963-57-0 |
| Precipitated silica with dimethyldichlorosilane surface modification | Aerosil ® R 972 | Evonik Industries | 68611-44-9 |

I. Preparation of PSAs PA1 to PA5

Described below is the preparation of the starting polymers. The polymers investigated are prepared conventionally via free radical polymerization in solution.

Polyacrylate PSA 1 (PA 1)

A 100 l glass reactor conventional for free-radical polymerizations was charged with 2.0 kg of acrylic acid, 13.0 kg of butyl acrylate, 25.0 kg of 2-ethylhexyl acrylate and 26.7 kg of acetone/benzine 60/95 (1:1). After nitrogen gas had been passed through the reactor for 45 minutes with stirring, the reactor was heated to 58° C. and 30 g of AIBN were added. Subsequently the external heating bath was heated to 75° C. and the reaction was carried out constantly at this external temperature. After a reaction time of 1 h a further 30 g of AIBN were added. After 4 h and again after 8 h, the batch was diluted with 10.0 kg of acetone/benzine 60/95 (1:1) mixture in each case. For reduction of the residual initiators, 90 g portions of bis(4-tert-butylcyclohexyl)peroxydicarbonate were added after 8 h and again after 10 h. After a reaction time of 24 h the reaction was terminated and the batch was cooled to room temperature. Subsequently the polyacrylate was blended with 0.2% by weight of Uvacure® 1500, diluted to a solids content of 30% with acetone and then coated from solution onto a siliconized release film (50 μm polyester) or onto a 23 μm thick etched PET film (coating speed 2.5 m/min, drying tunnel 15 m, temperatures zone 1: 40° C., zone 2: 70° C., zone 3: 95° C., zone 4: 105° C.). The coat weight was 50 g/m².

Polyacrylate PSA 2 (PA 2)

A 100 l glass reactor conventional for free-radical polymerizations was charged with 4.0 kg of acrylic acid, 12.0 kg of butyl acrylate, 24.0 kg of 2-ethylhexyl acrylate and 26.7 kg of acetone/benzine 60/95 (1:1). After nitrogen gas had been passed through the reactor for 45 minutes with stirring, the reactor was heated to 58° C. and 30 g of AIBN were added. Subsequently the external heating bath was heated to 75° C. and the reaction was carried out constantly at this external temperature. After a reaction time of 1 h a further 30 g of AIBN were added. After 4 h and again after 8 h, the batch was diluted with 10.0 kg of acetone/benzine 60/95 (1:1) mixture in each case. For reduction of the residual initiators, 90 g portions of bis(4-tert-butylcyclohexyl)peroxydicarbonate were added after 8 h and again after 10 h. After a reaction time of 24 h the reaction was terminated and the batch was cooled to room temperature. Subsequently the polyacrylate was blended with 0.2% by weight of Uvacure® 1500, diluted to a solids content of 30% with acetone and then coated from solution onto a siliconized release film (50 μm polyester) or onto a 23 μm thick etched PET film (coating speed 2.5 m/min, drying tunnel 15 m, temperatures zone 1: 40° C., zone 2: 70° C., zone 3: 95° C., zone 4: 105° C.). The coat weight was 50 g/m².

Polyacrylate PSA 3 (PA 3)

A 100 l glass reactor conventional for free-radical polymerizations was charged with 4.8 kg of acrylic acid, 11.6 kg of butyl acrylate, 23.6 kg of 2-ethylhexyl acrylate and 26.7 kg of acetone/benzine 60/95 (1:1). After nitrogen gas had been passed through the reactor for 45 minutes with stirring, the reactor was heated to 58° C. and 30 g of AIBN were added. Subsequently the external heating bath was heated to 75° C. and the reaction was carried out constantly at this external temperature. After a reaction time of 1 h a further 30 g of AIBN were added. After 4 h and again after 8 h, the batch was diluted with 10.0 kg of acetone/benzine 60/95 (1:1) mixture in each case. For reduction of the residual initiators, 90 g portions of bis(4-tert-butylcyclohexyl)peroxydicarbonate were added after 8 h and again after 10 h. After a reaction time of 24 h the reaction was terminated and the batch was cooled to room temperature. Subsequently the polyacrylate was blended with 0.2% by weight of Uvacure® 1500, diluted to a solids content of 30% with acetone and then coated from solution onto a siliconized release film (50 μm polyester) or onto a 23 μm thick etched PET film (coating speed 2.5 m/min, drying tunnel 15 m, temperatures zone 1: 40° C., zone 2: 70° C., zone 3: 95° C., zone 4: 105° C.). The coat weight was 50 g/m².

Comparative Example Polyacrylate PSA 4 (PA 4)

The base adhesive PA3 was used, and subsequently, after cooling, was blended with 0.2% by weight of aluminium(III) acetylacetonate (3% strength solution in isopropanol), diluted to a solids content of 30% with acetone and then coated from solution onto a siliconized release film (50 μm polyester) or onto a 23 μm thick etched PET film (coating speed 2.5 m/min, drying tunnel 15 m, temperatures zone 1: 40° C., zone 2: 70° C., zone 3: 95° C., zone 4: 105° C.). The coat weight was 50 g/m².

Comparative Example Polyacrylate PSA 5 (PA 5)

The base adhesive PA3 was used, and subsequently, after cooling, was blended with 0.25% by weight of Polypox® R16 as crosslinker and 0.18% by weight of Epikure 925 as accelerator, diluted to a solids content of 30% with acetone and then coated from solution onto a siliconized release film (50 μm polyester) or onto a 23 μm thick etched PET film (coating speed 2.5 m/min, drying tunnel 15 m, temperatures zone 1: 40° C., zone 2: 70° C., zone 3: 95° C., zone 4: 105° C.). The coat weight was 50 g/m².

TABLE 1

Key data of the polymers

|      | Tg [° C.] | K value | Mn [g/mol] | Mw [g/mol] | D    |
|------|-----------|---------|------------|------------|------|
| PA 1 | −45.2     | 47.5    | 90 452     | 1 501 700  | 16.6 |
| PA 2 | −41.6     | 46.9    | 88 142     | 1 500 900  | 17.0 |
| PA 3 | −39.1     | 46.2    | 85 147     | 1 499 000  | 17.6 |
| PA 4 | −39.1     | 46.2    | 85 142     | 1 499 000  | 17.6 |
| PA 5 | −39.1     | 46.2    | 85 142     | 1 499 000  | 17.6 |

Tg = static glass transition temperature,
D = Mw/Mn = polydispersity

For the measurement of the adhesive properties of the PSA without viscoelastic carrier, the polymers were coated from solution onto a 23 μm thick PET film, and dried. From the results in Table 2 it is evident that not only the PSAs PA 1-3 but also the comparative PSAs PA 4 and PA 5 are highly cohesive compositions with a moderate bond strength to steel. The non-inventive crosslinking of the PSA by means of coordination of the acrylic acid with aluminium(III) acetylacetonate or of the base-accelerated thermal crosslinking by means of a glycidyl ether results in significant detractions with regard to the thermal shear strength (shear resistance times at 70° C.).

TABLE 2

Adhesive data for PSAs PA 1-5 on 23 μm PET film

|      | Bond strength steel 180° [N/cm] | Bond strength steel 90° [N/cm] | Shear resistance times 23° C. [min] | Shear resistance times 70° C. [min] | MST max [μm] | Elastic component [%] |
|------|-------|-----|--------|-----|-----|----|
| PA 1 | 5.7   | 6.0 | 5442   | 180 | 532 | 92 |
| PA 2 | 5.8   | 6.1 | >10 000| 220 | 470 | 95 |
| PA 3 | 6.3   | 6.6 | >10 000| 251 | 416 | 97 |
| PA 4 | 6.3   | 6.6 | >10 000| 25  | 450 | 92 |
| PA 5 | 6.3   | 6.6 | >10 000| 44  | 297 | 97 |

Bond strength steel 180° = measurement method H1
Bond strength steel 90° = measurement method V1
Shear resistance times 23° and 70° C. = measurement method H2
MST = microshear test = measurement method H3

II Preparation of the Starting Polymers for the Viscoelastic Carries of Example VT 1 to 19

Described below is the preparation of the starting polymers. The polymers investigated are prepared conventionally via free radical polymerization in solution.

Base Polymer HPT 1

A reactor conventional for free-radical polymerizations was charged with 55.2 kg of 2-ethylhexyl acrylate, 20.8 kg of methyl acrylate, 4.0 kg of acrylic acid and 53.3 kg of acetone/isopropanol (94:6). After nitrogen gas had been passed through the reactor for 45 minutes with stirring, the reactor was heated to 58° C. and 40 g of AIBN were added. Subsequently the external heating bath was heated to 75° C. and the reaction was carried out constantly at this external temperature. After 1 h a further 40 g of AIBN were added, and after 4 h the batch was diluted with 10 kg of acetone/isopropanol mixture (94:6).

After 5 h and again after 7 h, reinitiation took place with 120 g of bis(4-tert-butylcyclohexyl) peroxydicarbonate in each case. After a reaction time of 22 h the polymerization was terminated and the batch was cooled to room temperature. The polyacrylate has a K value of 59.5, a solids content of 55.9%, an average molecular weight of Mw=764 000 g/mol, polydispersity D (Mw/Mn)=8.6, and a static glass transition temperature of Tg=−40.0° C.

Base Polymer HPT 2

A reactor conventional for free-radical polymerizations was charged with 54.4 kg of 2-ethylhexyl acrylate, 20.0 kg of methyl acrylate, 5.6 kg of acrylic acid and 53.3 kg of acetone/isopropanol (94:6). After nitrogen gas had been passed through the reactor for 45 minutes with stirring, the reactor was heated to 58° C. and 40 g of AIBN were added. Subsequently the external heating bath was heated to 75° C. and the reaction was carried out constantly at this external temperature. After 1 h a further 40 g of AIBN were added, and after 4 h the batch was diluted with 10 kg of acetone/isopropanol mixture (94:6).

After 5 h and again after 7 h, reinitiation took place with 120 g of bis(4-tert-butylcyclohexyl) peroxydicarbonate in each case. After a reaction time of 22 h the polymerization was terminated and the batch was cooled to room temperature. The polyacrylate has a K value of 58.8, a solids content of 55.9%, an average molecular weight of Mw=746 000 g/mol, polydispersity D (Mw/Mn)=8.9, and a static glass transition temperature of Tg=−35.6° C.

Base Polymer HPT 3

A reactor conventional for free-radical polymerizations was charged with 52.4 kg of 2-ethylhexyl acrylate, 18.0 kg of methyl acrylate, 9.6 kg of acrylic acid and 53.3 kg of acetone/isopropanol (94:6). After nitrogen gas had been passed through the reactor for 45 minutes with stirring, the reactor was heated to 58° C. and 40 g of AIBN were added. Subsequently the external heating bath was heated to 75° C. and the reaction was carried out constantly at this external temperature. After 1 h a further 40 g of AIBN were added, and after 4 h the batch was diluted with 10 kg of acetone/isopropanol mixture (94:6).

After 5 h and again after 7 h, reinitiation took place with 120 g of bis(4-tert-butylcyclohexyl)peroxydicarbonate in each case. After a reaction time of 22 h the polymerization was terminated and the batch was cooled to room temperature. The polyacrylate has a K value of 57.1, a solids content of 55.9%, an average molecular weight of Mw=714 000 g/mol, polydispersity D (Mw/Mn)=7.6, and a static glass transition temperature of Tg=−27.2° C.

Base Polymer HPT 4

A reactor conventional for free-radical polymerizations was charged with 24.0 kg of 2-ethylhexyl acrylate, 53.6 kg of methyl acrylate, 2.4 kg of acrylic acid and 53.3 kg of acetone/isopropanol (96:4). After nitrogen gas had been passed through the reactor for 45 minutes with stirring, the reactor was heated to 58° C. and 40 g of AIBN were added. Subsequently the external heating bath was heated to 75° C. and the reaction was carried out constantly at this external temperature. After 1 h a further 40 g of AIBN were added, and after 4 h the batch was diluted with 10 kg of acetone/isopropanol mixture (96:4).

After 5 h and again after 7 h, reinitiation took place with 120 g of bis(4-tert-butylcyclohexyl) peroxydicarbonate in each case. After a reaction time of 22 h the polymerization was terminated and the batch was cooled to room temperature. The polyacrylate has a K value of 77.8, a solids content of 55.9%, an average molecular weight of Mw=1 040 000 g/mol, polydispersity D (Mw/Mn)=13.3, and a static glass transition temperature of Tg=−45.1° C.

Base Polymer HPT 5

During the polymerization of HPT 2, a further 5% by weight (based on polymer solids) of Aerosil R 972 was used additionally.

The polyacrylate has a K value of 58.8, a solids content of 61.3%, an average molecular weight of Mw=746 000 g/mol, polydispersity D (Mw/Mn)=8.9, and a static glass transition temperature of Tg=−43.6° C.

Base Polymer HPT 6

During the polymerization of HPT 2, a further 10% by weight (based on polymer solids) of Aerosil R 972 was used additionally.

The polyacrylate has a K value of 58.8, a solids content of 62.4%, an average molecular weight of Mw=746 000 g/mol, polydispersity D (Mw/Mn)=8.9, and a static glass transition temperature of Tg=−47.2° C.

Base Polymer HPT 7

During the polymerization of HPT 2, a further 15% by weight (based on polymer solids) of Aerosil R 972 was used additionally.

The polyacrylate has a K value of 58.8, a solids content of 62.4%, an average molecular weight of Mw=746 000 g/mol, polydispersity D (Mw/Mn)=8.9, and a static glass transition temperature of Tg=−49.7° C.

In order to illustrate that only the inventive combination of the cohesive, weakly tacky PSA with the viscoelastic, soft carrier results in an adhesive tape having very good adhesive properties, Table 3 lists the data of the polymers used for the viscoelastic carrier. The specimens were produced in accordance with processes 1 and 2 as an adhesive transfer tape having a layer thickness of 900 μm. The concentration of crosslinker corresponds to Examples MT 1 to MT 7.

TABLE 3

Adhesive data for PSAs PA 1-5 on 23 μm PET film

|  | Bond strength steel 180° [N/cm] | Bond strength steel 90° [N/cm] | Shear resistance times 23° C. [min] | Shear resistance times 70° C. [min] | MST max [μm] | Elastic component [%] |
| --- | --- | --- | --- | --- | --- | --- |
| PA 1 | 5.7 | 6.0 | 5442 | 180 | 532 | 92 |
| PA 2 | 5.8 | 6.1 | >10 000 | 220 | 470 | 95 |
| PA 3 | 6.3 | 6.6 | >10 000 | 251 | 416 | 97 |
| PA 4 | 6.2 | 6.6 | >10 000 | 25 | 450 | 92 |
| PA 5 | 6.3 | 6.6 | >10 000 | 44 | 297 | 97 |

Bond strength steel 180° = measurement method H1
Bond strength steel 90° = measurement method V1
Shear resistance times 23° and 70° C. = measurement method H2
MST = microshear test = measurement method H3

Process 1: Concentration/Preparation of the Hotmelt PSAs:

The acrylate copolymers (base polymers HPT 1 to HPT 7) are very largely freed from the solvent by means of a single-screw extruder (concentrating extruder, Berstorff GmbH, Germany) (residual solvent content ≦0.3% by weight; cf. the individual examples). The parameters given here by way of example are those for the concentration of base polymer HPT1. The screw speed was 150 rpm, the motor current 15 A, and a throughput of 58.0 kg liquid/h was realized. For concentration, a vacuum was applied at 3 different domes. The reduced pressures were, respectively, between 20 mbar and 300 mbar. The exit temperature of the concentrated hotmelt is approximately 115° C. The solids content after this concentration step was 99.8%.

Process 2: Production of the Inventive Adhesive Tapes, Blending with the Crosslinker-Accelerator System for Thermal Crosslinking, and Coating The acrylate hotmelt PSAs prepared by Process 1 were melted in a feeder extruder (single-screw conveying extruder from Troester GmbH & Co. KG, Germany) and using this extruder were conveyed as a polymer melt into a twin-screw extruder (Leistritz, Germany, ref. LSM 30/34). The assembly is heated electrically from the outside and is air-cooled by a number of fans, and is designed such that, with effective distribution of the crosslinker-accelerator system in the polymer matrix, there is at the same time a short residence time ensured for the adhesive in the extruder. For this purpose the mixing shafts of the twin-screw extruder were arranged in such a way that conveying elements are in alternation with mixing elements. The addition of the respective crosslinkers and accelerators is made with suitable metering equipment, where appropriate at two or more points (FIG. 1: metering points 1.1 and 1.2) and, where appropriate, with the use of metering assistants into the unpressurized conveying zones of the twin-screw extruder.

Following exit of the ready-compounded adhesive, i.e. of the adhesive blended with the crosslinker-accelerator system, from the twin-screw extruder (exit: circular die, 5 mm diameter), coating takes place in accordance with FIG. 1 onto a backing material in web form. The time between metered addition of the crosslinker-accelerator system and the shaping or coating procedure is termed the processing life. The processing life indicates the period within which the adhesive, blended with the crosslinker-accelerator system, or the viscoelastic backing layer, can be coated with a visually good appearance (gel-free, speck-free). Coating takes place with web speeds between 1 m/min and 20 m/min; the doctor roll of the 2-roll applicator is not driven.

In the examples below and in Tables 4 to 7, the formulations employed and the properties obtained are each described in more detail.

Process 3: Production of the 3-Layer Constructions by Means of 2-Roll Calender

The process was carried out as described in FIG. 2. Using a manifold die (1), the viscoelastic composition (3), already compounded with the crosslinker-accelerator system and, where appropriate, fillers, is supplied to the roll nip. The shaping of the viscoelastic composition to a viscoelastic film takes place between the calender rolls (W1) and (W2) in the roll nip between two self-adhesive compositions (6a, 6b), which in turn are supplied coated onto anti-adhesively treated backing materials (5a, 5b). In this case there is, simultaneously, shaping of the viscoelastic composition to the set layer thickness, and coating with the two supplied self-adhesive compositions. In order to improve the anchoring of the self-adhesive compositions (6a, 6b) on the shaped viscoelastic backing layer (4), the self-adhesive compositions, before being supplied to the roll nip, are corona-treated by means of a corona station (8) (corona unit from Vitaphone, Denmark, 50 W·min/m$^2$). As a result of this treatment, following the production of the three-layer assembly, there is improved chemical attachment to the viscoelastic backing layer.

The web speed on passing through the coating unit is 30 m/min.

Following departure from the roll nip, an anti-adhesive backing (5a) is lined if appropriate, and the completed three-layer product (9) is wound up with the remaining second anti-adhesive backing (5b).

Presented below are specific examples relating to the preparation of the self-adhesive compositions and the coating of the adhesive tapes of the invention, without any intention that the invention should be unnecessarily restricted by the choice of formulations, configurations and operational parameters specified.

Example MT 1

The base polymer HPT 1 was concentrated by Process 1 (solids content 99.7%) and then compounded by Process 2 in a twin-screw extruder continuously with the crosslinker-accelerator system composed of pentaerythritol tetraglycidyl ether (Polypox® R16; 0.34% by weight based on the polyacrylate) and triethylenetetramine (Epikure® 925; 0.14% by weight based on the polyacrylate).

Coating to produce the viscoelastic carrier VT 1 from the base polymer HPT 1 between the composition layers PA 3, coated beforehand onto siliconized polyester films, takes place on a 2-roll applicator at roll temperatures of 100° C. by Process 3. The layer thickness of the viscoelastic carrier VT 1 was 900 µm. The corona power was 50 W·min/m$^2$. After 7 days of room-temperature storage, the adhesive data were measured for both the open and the lined sides. The data of Example MT 1 are summarized in Table 3.

Example MT 2

The base polymer HPT 2 was concentrated by Process 1 (solids content 99.8%) and then compounded by Process 2 in a twin-screw extruder continuously with the crosslinker-accelerator system composed of pentaerythritol tetraglycidyl ether (Polypox® R16; 0.34% by weight based on the polyacrylate) and triethylenetetramine (Epikure® 925; 0.14% by weight based on the polyacrylate).

Coating to produce the viscoelastic carrier VT 2 from the base polymer HPT 3 between the composition layers PA 3, coated beforehand onto siliconized polyester films, takes place on a 2-roll applicator at roll temperatures of 100° C. by Process 3. The layer thickness of the viscoelastic carrier VT 2 was 900 µm. The corona power was 50 W·min/m$^2$. After 7 days of room-temperature storage, the adhesive data were measured for both the open and the lined sides. The data of Example MT 2 are summarized in Table 3.

Example MT 3

The base polymer HPT 3 was concentrated by Process 1 (solids content 99.8%) and then compounded by Process 2 in a twin-screw extruder continuously with the crosslinker-accelerator system composed of pentaerythritol tetraglycidyl ether (Polypox® R16; 0.34% by weight based on the polyacrylate) and triethylenetetramine (Epikure® 925; 0.14% by weight based on the polyacrylate).

Coating to produce the viscoelastic carrier VT 3 from the base polymer HPT 3 between the composition layers PA 3, coated beforehand onto siliconized polyester films, takes place on a 2-roll applicator at roll temperatures of 100° C. by Process 3. The layer thickness of the viscoelastic carrier VT 3 was 900 µm. The corona power was 50 W·min/m$^2$. After 7 days of room-temperature storage, the adhesive data were measured for both the open and the lined sides. The data of Example MT 3 are summarized in Table 3.

Example MT 4

The base polymer HPT 4 was concentrated by Process 1 (solids content 99.7%) and then compounded by Process 2 in a twin-screw extruder continuously with the crosslinker-accelerator system composed of pentaerythritol tetraglycidyl ether (Polypox® R16; 0.23% by weight based on the polyacrylate) and triethylenetetramine (Epikure® 925; 0.14% by weight based on the polyacrylate).

Coating to produce the viscoelastic carrier VT 4 from the base polymer HPT 4 between the composition layers PA 3, coated beforehand onto siliconized polyester films, takes place on a 2-roll applicator at roll temperatures of 100° C. by Process 3. The layer thickness of the viscoelastic carrier VT 4 was 900 µm. The corona power was 50 W·min/m$^2$. After 7 days of room-temperature storage, the adhesive data were measured for both the open and the lined sides. The data of Example MT 4 are summarized in Table 3.

Example MT 5

The base polymer HPT 5 was concentrated by Process 1 (solids content 99.7%) and then compounded by Process 2 in a twin-screw extruder continuously with the crosslinker-accelerator system composed of pentaerythritol tetraglycidyl ether (Polypox® R16; 0.34% by weight based on the polyacrylate) and triethylenetetramine (Epikure® 925; 0.14% by weight based on the polyacrylate).

Coating to produce the viscoelastic carrier VT 5 from the base polymer HPT 5 between the composition layers PA 3, coated beforehand onto siliconized polyester films, takes place on a 2-roll applicator at roll temperatures of 100° C. by Process 3. The layer thickness of the viscoelastic carrier VT 5 was 900 µm. The corona power was 50 W·min/m². After 7 days of room-temperature storage, the adhesive data were measured for both the open and the lined sides. The data of Example MT 5 are summarized in Table 3.

Example MT 6

The base polymer HPT 6 was concentrated by Process 1 (solids content 99.9%) and then compounded by Process 2 in a twin-screw extruder continuously with the crosslinker-accelerator system composed of pentaerythritol tetraglycidyl ether (Polypox® R16; 0.34% by weight based on the polyacrylate) and triethylenetetramine (Epikure® 925; 0.14% by weight based on the polyacrylate).

Coating to produce the viscoelastic carrier VT 6 from the base polymer HPT 6 between the composition layers PA 3, coated beforehand onto siliconized polyester films, takes place on a 2-roll applicator at roll temperatures of 100° C. by Process 3. The layer thickness of the viscoelastic carrier VT 6 was 900 µm. The corona power was 50 W·min/m². After 7 days of room-temperature storage, the adhesive data were measured for both the open and the lined sides. The data of Example MT 6 are summarized in Table 3a.

Example MT 7

The base polymer HPT 7 was concentrated by Process 1 (solids content 99.8%) and then compounded by Process 2 in a twin-screw extruder continuously with the crosslinker-accelerator system composed of pentaerythritol tetraglycidyl ether (Polypox® R16; 0.34% by weight based on the polyacrylate) and triethylenetetramine (Epikure® 925; 0.14% by weight based on the polyacrylate).

Coating to produce the viscoelastic carrier VT 7 from the base polymer HPT 7 between the composition layers PA 3, coated beforehand onto siliconized polyester films, takes place on a 2-roll applicator at roll temperatures of 100° C. by Process 3. The layer thickness of the viscoelastic carrier VT 7 was 900 µm. The corona power was 50 W·min/m². After 7 days of room-temperature storage, the adhesive data were measured for both the open and the lined sides. The data of Example MT 7 are summarized in Table 3a.

Comparative Examples B 1-7

In order to illustrate that only the inventive combination of the cohesive, weakly tacky PSA with the viscoelastic, soft carrier results in an adhesive tape having very good adhesive properties, Table 3 lists the data of the polymers used for the viscoelastic carrier. The specimens were produced in accordance with processes 1 and 2 with a layer thickness of 900 µm on a 23 µm PET film. The concentration of crosslinker corresponds to Examples MT 1 to MT 7.

TABLE 3a

Adhesive data of the viscoelastic carriers

|  | Bond strength steel [N/cm] | Shear resistance times 23° C. [min] | Shear resistance times 70° C. [min] | MST max 100 g [µm] | Elastic component [%] |
|---|---|---|---|---|---|
| B 1 | 6.7 | 282 | 1 | 325 | 62 |
| B 2 | 6.2 | 321 | 15 | 270 | 65 |
| B 3 | 6.1 | 342 | 22 | 255 | 71 |
| B 4 | 6.2 | 345 | 18 | 265 | 67 |
| B 5 | 6.3 | 312 | 26 | 260 | 67 |
| B 6 | 5.6 | 752 | 85 | 221 | 70 |
| B 7 | 5.3 | 1023 | 122 | 198 | 73 |

Bond strength steel = measurement method H1
Shear resistance times 23° and 70° C. = measurement method H2
MST = microshear test = measurement method H3

Example MT 8-11

Variation of Layer Thickness

The base polymer HPT 2 was concentrated by Process 1 (solids content 99.7%-99.9%) and then compounded by Process 2 in a twin-screw extruder continuously with the crosslinker-accelerator system composed of pentaerythritol tetraglycidyl ether (Polypox® R16; 0.34% by weight based on the polyacrylate) and triethylenetetramine (Epikure® 925; 0.14% by weight based on the polyacrylate).

Coating to produce the viscoelastic carriers VT 8-11 from the base polymer HPT 2 between the composition layers PA 3, coated beforehand onto siliconized polyester films, takes place on a 2-roll applicator at roll temperatures of 100° C. by Process 3. The layer thickness of the viscoelastic carriers VT 8-11 was 400, 1400, 1900 and 2900 µm. The corona power was 50 W·min/m². After 7 days of room-temperature storage, the adhesive data were measured for both the open and the lined sides. The data of Examples MT 8-11 are summarized in Table 5.

Example MT 12-15

Variation of the Crosslinker Concentration in the Viscoelastic Carrier

The base polymer HPT 2 was concentrated by Process 1 (solids content 99.7%-99.9%) and then compounded by Process 2 in a twin-screw extruder continuously with the crosslinker-accelerator system composed of:
  MT 12: 0.28% by weight of pentaerythritol tetraglycidyl ether (Polypox® R16; based on the polyacrylate) and 0.14% by weight of triethylenetetramine (Epikure® 925; based on the polyacrylate), and also
  MT 13: 0.38% by weight of pentaerythritol tetraglycidyl ether (Polypox® R16; based on the polyacrylate) and 0.14% by weight of triethylenetetramine (Epikure® 925; based on the polyacrylate).

Furthermore, the base polymer HPT 4 was concentrated by Process 1 (solids content 99.7%-99.9%) and then compound by Process 2 in a twin-screw extruder continuously with the crosslinker-accelerator system composed of:
  MT 14: 0.18% by weight of pentaerythritol tetraglycidyl ether (Polypox® R16; based on the polyacrylate) and 0.14% by weight of triethylenetetramine (Epikure® 925; based on the polyacrylate), and also
  MT 15: 0.28% by weight of pentaerythritol tetraglycidyl ether (Polypox® R16; based on the polyacrylate) and 0.14% by weight of triethylenetetramine (Epikure® 925; based on the polyacrylate).

Coating to produce the viscoelastic carriers VT 12-15 from the base polymers HPT 2 and HPT 4 between the composition layers PA 3, coated beforehand onto siliconized polyester films, takes place on a 2-roll applicator at roll temperatures of 100° C. by Process 3. The layer thickness of the viscoelastic carriers VT 12-15 was 900 μm. The corona power was 50 W·min/m². After 7 days of room-temperature storage, the adhesive data were measured for both the open and lined sides. The data of Examples MT 12-15 are summarized in Table 6.

Example MT 16-19

Variation of PSA

The base polymers HPT 2 and HPT 4 were concentrated by Process 1 (solids content 99.7%-99.9%) and then compounded by Process 2 in a twin-screw extruder continuously with the crosslinker-accelerator system composed of pentaerythritol tetraglycidyl ether (Polypox® R16; 0.34% by weight based on the polyacrylate) and triethylenetetramine (Epikure® 925; 0.14% by weight based on the polyacrylate).

Coating to produce the viscoelastic carriers VT 16-19 from the base polymers HPT 2 and HPT 4 between the composition layers PA 3, PA 4 and PA 5, coated beforehand onto siliconized polyester films, takes place on a 2-roll applicator at roll temperatures of 100° C. by Process 3. The layer thickness of the viscoelastic carriers VT 16-19 was 900 μm. The corona power was 50 W·min/m². After 7 days of room-temperature storage, the adhesive data were measured for both the open and the lined sides. In addition, the specimens were stored for one month at 60° C. and 85% relative humidity. The data of Examples MT 16-19 are summarized in Table 7.

TABLE 3a

Product construction and adhesive data of the three-layer constructions with a total thickness of 1000 μm

| | Three-layer product | | | Carrier thickness [μm] | Bond strength to steel [N/cm] | | Shear resistance time 10N 23° C. [min] | | Wall hook test [min] | |
|---|---|---|---|---|---|---|---|---|---|---|
| Example | PSA 1 | Viscoelastic carrier layer | PSA 2 | | open side | lined side | open side | lined side | open side | lined side |
| MT 1 | 50 g/m² PA 3 | VT 1 | 50 g/m² PA 3 | 900 | 20.2 | 23.7 | 2018 | 2240 | 198 | 195 |
| MT 2 | 50 g/m² PA 3 | VT 2 | 50 g/m² PA 3 | 900 | 19.0 | 23.4 | 2210 | 2448 | 252 | 250 |
| MT 3 | 50 g/m² PA 3 | VT 3 | 50 g/m² PA 3 | 900 | 18.7 | 19.3 | 4500 | 4600 | 320 | 360 |
| MT 4 | 50 g/m² PA 3 | VT 4 | 50 g/m² PA 3 | 900 | 20.6 | 23.5 | 6620 | 6670 | 4250 | 4320 |
| MT 5 | 50 g/m² PA 3 | VT 5 | 50 g/m² PA 3 | 900 | 15.7 | 17.6 | >10 000 | >10 000 | 7540 | 7468 |
| MT 6 | 50 g/m² PA 3 | VT 6 | 50 g/m² PA 3 | 900 | 13.5 | 15.6 | >10 000 | >10 000 | >10 000 | >10 000 |
| MT 7 | 50 g/m² PA 3 | VT 7 | 50 g/m² PA 3 | 900 | 10.9 | 12.5 | >10 000 | >10 000 | >10 000 | >10 000 |

Bond strength to steel = measurement method V1
Shear resistance time = measurement method V2
Wall hook test = measurement method V3

TABLE 5

Product construction and adhesive data of a three-layer construction with different carrier thicknesses

| | Three-layer product | | | Carrier thickness [μm] | Bond strength to steel [N/cm] | | Shear resistance time 10N 23° C. [min] | | Wall hook test [min] | |
|---|---|---|---|---|---|---|---|---|---|---|
| Example | PSA 1 | Viscoelastic carrier layer | PSA 2 | | open side | lined side | open side | lined side | open side | lined side |
| MT 8 | 50 g/m² PA 3 | HPT 2 | 50 g/m² PA 3 | 400 | 15.9 | 17.9 | 1799 | 705 | 2249 | 2500 |
| MT 2 | 50 g/m² PA 3 | HPT 2 | 50 g/m² PA 3 | 900 | 19.0 | 23.4 | 2210 | 2448 | 252 | 250 |
| MT 9 | 50 g/m² PA 3 | HPT 2 | 50 g/m² PA 3 | 1400 | 27.6 | 30.1 | 2472 | 1309 | 79 | 85 |

TABLE 5-continued

Product construction and adhesive data of a three-layer construction with different carrier thicknesses

| Example | Three-layer product | | | Carrier thickness [μm] | Bond strength to steel [N/cm] | | Shear resistance time 10N 23° C. [min] | | Wall hook test [min] | |
|---|---|---|---|---|---|---|---|---|---|---|
| | PSA 1 | Visco-elastic carrier layer | PSA 2 | | open side | lined side | open side | lined side | open side | lined side |
| MT 10 | 50 g/m² PA 3 | HPT 2 | 50 g/m² PA 3 | 1900 | 29.5 | 32.6 | 2002 | 755 | 25 | 32 |
| MT 11 | 50 g/m² PA 3 | HPT 2 | 50 g/m² PA 3 | 2900 | 31.4 | 34.7 | 1433 | 468 | 9 | 9 |

TABLE 6

Product construction and adhesive data of a three-layer construction with different crosslinker concentrations

| Example | Three-layer product | | | Carrier thickness [μm] | Bond strength to steel [N/cm] | | Shear resistance time 10N 23° C. [min] | | Wall hook test [min] | |
|---|---|---|---|---|---|---|---|---|---|---|
| | PSA 1 | Visco-elastic carrier layer | PSA 2 | | open side | lined side | open side | lined side | open side | lined side |
| MT 12 | 50 g/m² PA 3 | HPT 2 | 50 g/m² PA 3 | 900 | 25.9 | 27.9 | 729 | 715 | 1249 | 1248 |
| MT 2 | 50 g/m² PA 3 | HPT 2 | 50 g/m² PA 3 | 900 | 19.0 | 23.4 | 2210 | 2448 | 252 | 250 |
| MT 13 | 50 g/m² PA 3 | HPT 2 | 50 g/m² PA 3 | 900 | 17.6 | 18.1 | 3573 | 3709 | 3569 | 3855 |
| MT 14 | 50 g/m² PA 3 | HPT 4 | 50 g/m² PA 3 | 900 | 23.5 | 25.6 | 802 | 755 | 25 | 32 |
| MT 4 | 50 g/m² PA 3 | HPT 4 | 50 g/m² PA 3 | 900 | 20.6 | 23.5 | 6620 | 6670 | 4250 | 4320 |
| MT 15 | 50 g/m² PA 3 | HPT 4 | 50 g/m² PA 3 | 900 | 19.4 | 19.7 | >10 000 | >10 000 | >10 000 | >10 000 |

TABLE 7

Product construction and adhesive data of a three-layer construction with different PSA layers under different storage conditions

| Example | Three-layer product | | | Carrier thickness [μm] | Bond strength to steel [N/cm] | | Shear resistance time 10N 70° C. [min] | | Shear resistance time after heat and humidity storage 10N 23° C. [min] | | Appearance after heat and humidity storage |
|---|---|---|---|---|---|---|---|---|---|---|---|
| | PSA 1 | Visco-elastic carrier layer | PSA 2 | | open side | lined side | open side | lined side | open side | lined side | |
| MT 2 | 50 g/m² PA 3 | HPT 2 | 50 g/m² PA 3 | 900 | 19.0 | 23.4 | 710 | 748 | 2252 | 2250 | transparent |
| MT 16 | 50 g/m² PA 4 | HPT 2 | 50 g/m² PA 4 | 900 | 20.6 | 22.5 | 20 | 25 | 250 | 320 | hazy |
| MT 17 | 50 g/m² PA 5 | HPT 2 | 50 g/m² PA 5 | 900 | 19.6 | 20.1 | 33 | 39 | 1569 | 1855 | yellow haze |
| MT 4 | 50 g/m² PA 3 | HPT 4 | 50 g/m² PA 3 | 900 | 20.6 | 23.5 | 1120 | 1070 | 4250 | 4320 | transparent |
| MT 18 | 50 g/m² PA 4 | HPT 4 | 50 g/m² PA 4 | 900 | 20.4 | 22.5 | 5 | 7 | 125 | 120 | hazy |
| MT 19 | 50 g/m² PA 5 | HPT 4 | 50 g/m² PA 5 | 900 | 19.4 | 19.7 | 123 | 152 | 3480 | 4036 | yellow haze |

The invention claimed is:

1. Double-sided adhesive tape comprising a viscoelastic, first polymer layer having a top face and a bottom face, a second polymer layer on the top face and a third polymer layer on the bottom face of the viscoelastic, first polymer layer, wherein
the viscoelastic, first polymer layer is based on a polymer which is obtained by polymerization of a monomer composition of
65% to 97% by weight of ethylhexyl acrylate and/or butyl acrylate,
0% to 30% by weight of methyl acrylate,
3% to 15% by weight of acrylic acid,
the viscoelastic interlayer being crosslinked,
the second polymer layer is based on a polymer which is obtained by polymerization of a monomer composition of
85% to 95% by weight of ethylhexyl acrylate and/or butyl acrylate,
5% to 15% by weight of acrylic acid,
this second polymer layer being thermally crosslinked using at least one epoxycyclohexyl derivative in an amount of up to 0.4% by weight, and in the absence of accelerators.

2. At least single-sidedly adhesive, at least two-layer adhesive tape, comprising
a first, viscoelastic polymer layer,
a second polymer layer provided on the top face of the first polymer layer,
wherein
the first polymer layer has an elastic component of less than 80%,
and
the second polymer layer has an elastic component of more than 80%.

3. Adhesive tape according to claim 2, wherein
the viscoelastic, first polymer layer is based on a polymer which is obtained by polymerization of a monomer composition of
65% to 97% by weight of ethylhexyl acrylate and/or butyl acrylate,
0% to 30% by weight of methyl acrylate,
3% to 15% by weight of acrylic acid,
the viscoelastic interlayer being crosslinked.

4. Adhesive tape according to claim 2, wherein
the second polymer layer is based on a polymer which is obtained by polymerization of a monomer composition of
85% to 95% by weight of ethylhexyl acrylate and/or butyl acrylate,
5% to 15% by weight of acrylic acid,
this layer of pressure-sensitive adhesive being thermally crosslinked using at least one epoxycyclohexyl derivative in an amount of up to 0.4% by weight, and in the absence of accelerators.

5. Adhesive tape according to claim 2, wherein on the bottom face of the first polymer layer there is a third polymer layer, which likewise has an elastic component of more than 80%.

6. Adhesive tape according to claim 1, wherein
the third polymer layer is based on a polymer which is obtained by polymerization of a monomer composition of
85% to 95% by weight of ethylhexyl acrylate and/or butyl acrylate,
5% to 15% by weight of acrylic acid,
this third polymer layer being thermally crosslinked using at least one epoxycyclohexyl derivative in an amount of up to 0.4% by weight, and in the absence of accelerators.

7. Adhesive tape according to claim 1, wherein
the second and third polymer layers are chemically identical.

8. Adhesive tape according to claim 1, having a thickness of at least 300 µm.

9. Adhesive tape according to claim 1, wherein the second and/or third polymer layers have no addition of tackifier resins.

10. Adhesive tape according to claim 1, wherein the epoxycyclohexyl derivative for crosslinking the layer or layers of pressure-sensitive adhesive is an epoxycyclohexylcarboxylate.

11. Adhesive tape according to claim 1, wherein on at least one of its adhesive tape sides, it has a bond strength to steel of at least 10 N/cm.

12. Process for preparing a crosslinked pressure-sensitive acrylate adhesive obtained by polymerization of a monomer mixture containing at least 5% by weight of acrylic acid, wherein said adhesive is crosslinked with crosslinker of at least one epoxycyclohexyl derivative in an amount of up to 0.4% by weight, and in the absence of accelerators.

13. Process for producing a double-sided adhesive tape comprising a viscoelastic, first polymer layer and also a second polymer layer on the top face and on the bottom face of the interlayer,
comprising the thermal crosslinking of at least one layer of pressure-sensitive adhesive which is based on a polymer which is obtained by polymerization of a monomer composition of
58% to 65% by weight of ethylhexyl acrylate,
28% to 35% by weight of butyl acrylate,
5% to 15% by weight of acrylic acid,
using at least one epoxycyclohexyl derivative in an amount of up to 0.4% by weight as crosslinker in the absence of accelerators.

14. Process according to claim 13, wherein the epoxycyclohexyl derivative for crosslinking the layer or layers of pressure-sensitive adhesive is an epoxycyclohexylcarboxylate.

15. Adhesive tape according to claim 5, wherein the second and third polymer layers are chemically identical.

16. Adhesive tape according to claim 6, wherein the second and third polymer layers are chemically identical.

17. The adhesive tape of claim 10 wherein said epoxycyclohexylcarboxylate is (3,4-epoxycyclohexane)methyl 3,4-epoxycyclohexylcarboxylate.

18. The adhesive tape of claim 11 wherein said bond strength to steel is 17 N/cm or more.

19. The process of claim 14, wherein said epoxycyclohexylcarboxylate is (3,4-epoxycyclohexane)methyl 3,4-epoxycyclohexylcarboxylate.

* * * * *